United States Patent [19]

Eshelman

[11] 4,270,955
[45] Jun. 2, 1981

[54] TREATMENT FOR REDUCING THE DUSTING OF TREATED ZINC OXIDE

[75] Inventor: Donald M. Eshelman, Perry, Ohio

[73] Assignee: The New Jersey Zinc Company, Nashville, Tenn.

[21] Appl. No.: 145,008

[22] Filed: Apr. 29, 1980

[51] Int. Cl.$^3$ .............................................. C09C 1/04
[52] U.S. Cl. ................................ 106/296; 106/308 Q; 106/308 F
[58] Field of Search ............... 106/296, 308 F, 308 Q, 106/309

[56] References Cited

U.S. PATENT DOCUMENTS

| | | | |
|---|---|---|---|
| 2,251,871 | 8/1941 | Gamble | 106/296 |
| 2,303,330 | 12/1942 | Silver et al. | 106/296 |
| 3,923,712 | 12/1975 | Vickery | 106/308 F |
| 4,186,028 | 1/1980 | Woditsch et al. | 106/296 |

*Primary Examiner*—Helen M. McCarthy
*Attorney, Agent, or Firm*—Vincent J. Vasta, Jr.

[57] ABSTRACT

A treatment for reducing the dusting of a particulate zinc oxide which has been treated with an organic compound, such as propionic acid, for incorporation in rubbers and plastics, comprising treating said particulate zinc oxide which a composition selected from the group comprising trialkyl phosphates, tricresyl phosphate and mixtures thereof in an amount sufficient to reduce the dusting index thereof.

32 Claims, No Drawings

TREATMENT FOR REDUCING THE DUSTING OF TREATED ZINC OXIDE

This invention provides for a novel zinc oxide product comprising a particulate zinc oxide which has been treated with an organic compound, such as propionic acid, and subsequently treated with a composition selected from the group comprising trialkyl phosphates, tricresyl phosphate and mixtures thereof in an amount sufficient to reduce the dusting index thereof.

BACKGROUND OF THE INVENTION

It is common practice in the preparation of particulate zinc oxides for incorporation in various organic media, such as rubbers and plastics, to treat such particulate zinc oxides with an organic compound such as, for instance, propionic acid, in order to make the surface of such zinc oxide hydrophobic and thus improve the dispersion time of the resultant zinc oxide into the rubber or plastic organic media.

As a result of treating such zinc oxides to improve their dispersion characteristics, one generally obtains a particulate zinc oxide which is extremely dusty and which presents a significant disadvantage in handling in that the increased dustiness, particularly of propionic acid treated zinc oxide, creates environmental pollution problems and, in addition, presents process control problems and results in an unpleasant working environment.

It is, therefore, of primary importance that the certain treated zinc oxides, and in particular propionic acid treated zinc oxides, be further modified to reduce their dusting index, which is a measure of their dustiness characteristics, while, at the same time, maintaining the improved dispersion time characteristics of such materials, which has been achieved via the initial treatment of such materials.

Various processes have been suggested to reduce the dustiness of propionic acid treated zinc oxide materials, all of which have met with limited acceptance either due to their minimal effectiveness or to the adverse impact of such processes upon the previously enhanced dispersion time characteristics of the resultant treated materials.

For example, the addition of light processing oils such as Circo oil, a product of the Sun Oil Company, can help to reduce the dusting index, however, the reduction obtained is not considered sufficient for most applications.

In addition, various processes involving pelletizing and/or densification of the treated zinc oxide material have been suggested and, while successful in reducing the dusting index, result in a material whose dispersion time characteristics are adversely affected.

Exemplary of various processes which are available in the prior art are the following:

U.S. Pat. No. 2,251,871 to Gamble et al. which issued on Aug. 5, 1941, relates to the manufacture of zinc oxide pigments in which the zinc oxide particles are surface coated with a zinc phosphate. In order to achieve this surface coating the zinc oxide is heated with an ester of phosphoric acid, such as aryl or alkyl phosphates, in such a fashion that these phosphates are decomposed while in contact with the surface of zinc oxide particle with the resultant formation of a phosphate coating. The express purpose of such treatment is to reduce the reactivity of the zinc oxide particles with various acidic ingredients in paint vehicles and to increase resistance to metallic staining.

U.S. Pat. No. 2,333,367 to Eide et al. which issued on Nov. 2, 1943, discloses the use of phosphorus oxides in combination with various alkyd resins to reduce the hazing of zinc oxide pigments.

U.S. Pat. No. 3,003,965 to Troelstra et al. which issued on Oct. 10, 1961 relates to methods of distributing powders in organic liquids in which the powdered material to be distributed is treated with a derivative of phosphoric acid in which a phosphorus atom carries at least one acid function and at least one alkyl-, aryl- or aralkyl group on an interposed oxygen atom.

U.S. Pat. No. 3,290,164 to Ferrigno et al. which issued on Dec. 6, 1966 relates to kaolin clay which is coated with a halogenated organic phosphorus compound and to improved polyester resin compositions formulated using the novel coated clays.

U.S. Pat. No. 3,545,994 to Lott, Jr. et al. which issued on Dec. 8, 1970 relates to the treatment of pigmentary metal oxides via coating in an aqueous slurry with a hydrous metal oxide by adjusting the slurry's pH with a weak acid or weak base which is generated in situ, requiring the use of a water soluble hydrolyzable compound which will hydrolyze to generate the weak acid in situ.

U.S. Pat. No. 3,649,321 to Durrant et al. which issued on Mar. 14, 1972 relates to titanium dioxide particles having improved resistance to dusting prepared by providing a coating on the particles of a mixture of at least one ester and at least one silicone.

U.S. Pat. No. 3,808,022 to Twist et al. which issued on Apr. 20, 1974 teaches pigmentary titanium dioxide which has been coated with a propane diol in an amount of from 0.05 to 3 weight percent, the particles of which may also be optionally coated with one or more hydrous metal oxides prior to coating with propane diol.

None of the foregoing prior art teachings suggest the method which is the subject of the present application which involves the treatment of a particulate zinc oxide material, which has been previously treated to improve dispersion time in organic media, in order to improve the dusting index thereof.

It is, therefore, an object of the present invention to provide a method for the preparation of treated particulate zinc oxides, which zinc oxides have been previously treated to enhance their dispersion time characteristics in various organic media, in order to improve the dusting index of such zinc oxide materials, while, at the same time, maintaining the enhanced dispersion time characteristics achieved via the initial treatment.

It is a further object of the present invention to provide a method for the preparation of a particulate zinc oxide material which will be commercially acceptable for incorporation into various organic media, such as rubbers and plastics, comprising the initial treatment of such zinc oxide material with an organic compound, such as propionic acid, to improve the dispersion time thereof in an organic media, and the subsequent treatment of such zinc oxide material with a composition selected from the group comprising trialkyl phosphates and tricresyl phosphate to improve the dusting index of the resultant material.

It is yet another object of the present invention to provide for a treatment for reducing the dusting of a particulate zinc oxide material, which has been previously treated with propionic acid, for use in incorporation in rubbers and plastics, comprising treating said particulate zinc oxide material with a composition selected from the group comprising trialkyl phosphates, tricresyl phosphate and mixtures thereof in an amount sufficient to reduce the dusting index thereof.

These and other objects of this invention will become apparent in the following description of the invention.

SUMMARY OF THE INVENTION

In accordance with the present invention, a process is provided for reducing the dusting of a particulate zinc oxide material which has been treated with an organic compound, such as propionic acid, for incorporation in rubbers and plastics, comprising treating said particulate zinc oxide with a composition selcted from the group comprising trialkyl phosphates, tricresyl phosphate and mixtures thereof in an amount sufficient to reduce the dusting index thereof.

This invention also provides for a novel zinc oxide product comprising zinc oxide which has been treated with an organic compound, such as propionic acid, and subsequently treated with a composition selected from the group comprising trialkyl phosphates, triscresyl phosphate and mixtures thereof in an amount sufficient to reduce the dusting index thereof.

DESCRIPTION OF THE PREFERRED EMBODIMENTS

It has been found that in order to achieve a significant reduction in the dusting index of a particulate zinc oxide base material, which has been previously treated with an organic compound, such as propionic acid, to reduce the incorporation time in rubbers and plastics according to the present invention, it is necessary to treat the modified zinc oxide with from about 0.05 weight percent to about 1.0 weight percent of a composition selected from the group comprising trialkyl phosphates, tricresyl phosphate and mixtures thereof, and, preferably, with from about 0.20 to 0.75 weight percent of such a composition to achieve optimum results.

The trialkyl phosphates and tricresyl phosphate which are useful as additives in the present invention are well-known, commercially available compositions, the preparation of which will be apparent to those skilled in the art.

The preferred trialkyl phosphates for the treatment of a particulate zinc oxide material, which has been previously treated with an organic compound, such as propionic acid, are the trialkyl phosphates selected from the group comprising triethyl phosphate, tributyl phosphate and tributoxyethyl phosphate either alone or in admixture. The trialkyl phosphates may also be effectively employed in admixture with tricresyl phosphate. In addition, the trialkyl phosphates and/or tricresyl phosphate may be effectively employed in admixture with a light processing oil such as Circo oil.

While the particular method of treating the zinc oxide material is not critical, it has been found that an effective treatment may be achieved by the utilization of a Patterson-Kelley liquid-solids blender or by other known commercially available techniques which achieve a uniform distribution of the phosphate composition on the surface of the previously treated particulate zinc oxide.

The nature of the present invention may be more clearly understood by recourse to the following examples, which are set forth for illustrative purposes only and are not to be construed as limiting the invention thereto.

EXAMPLES

GENERAL COMMENTS

In determining the relative dustiness of various materials, a procedure was employed wherein the treated and untreated test material was dropped into a chamber from which the dust generated, flowed into an adjacent chamber which contained a light source and a photo cell. Light transmittance was monitored with time to provide a measure of the dustiness of the material.

The procedure was carried out utilizing three separate 50 gram samples of each material tested, with readings from a microampere meter being taken after five seconds elapsed time from the dropping of the sample into the test chamber. Using the average microampere measurement from the three separate determinations, the dusting index is determined according to the following:

$D.I. = 100-M$ where $D.I.$ = dusting index $M$ = average microampere measurement in three tests.

According to the above procedure, a higher dusting index denotes greater dusting.

The control or base material used in each series of Examples which follow may or may not have been the same as that used in the previous series; the same production lot may have been depleted by the time the next series was to be run. Since the dusting index does vary from lot to lot, the values for the controls may differ.

The base zinc oxide used in all of the following Examples has a specific surface area of about 4 sq.m./g. Zinc oxide having higher surface areas, e.g. KADOX-15 having a specific surface area of about 10 sq.m./g. would require proportionately larger quantities of additive as indicated in the following Table.

| Zinc Oxide | Amount TBP % | Analyzed TBP % | Dusting Index |
|---|---|---|---|
| High Surface Area | — | — | 12 |
| P.A. Treated High Surface Area | — | — | 24 |
| P.A. Treated | 0.25 | 0.27 | 17 |
| P.A. Treated | 0.50 | 0.41 | 14 |
| P.A. Treated with 0.50 Circo Oil Only | — | —20 | |

EXAMPLES 1-10

Various quantities of tricresyl phosphate and different trialkyl phosphates were added to a propionic acid treated particulate zinc oxide material. The results of dusting index determinations carried out in accordance with the above procedure are set forth in Table I below.

TABLE I
EFFECT OF ORGANIC PHOSPHATES ON REDUCING THE DUSTINESS OF A PROPIONIC ACID-TREATED OXIDE

| Example No. | Phosphate Compound | Weight % Addition | Dusting Index |
|---|---|---|---|
| 1 (Control) | None | — | 20 |
| 2 | Tricresyl phosphate | 0.50 | 10 |
| 3 | Tricresyl phosphate | 0.75 | 15 |
| 4 | Tricresyl phosphate | 1.0 | 16 |
| 5 | Triethyl phosphate | 0.25 | 21 |
| 6 | Triethyl phosphate | 0.50 | 22 |
| 7 | Triethyl phosphate | 0.75 | 8 |

TABLE I-continued
EFFECT OF ORGANIC PHOSPHATES ON REDUCING THE DUSTINESS OF A PROPIONIC ACID-TREATED OXIDE

| Example No. | Phosphate Compound | Weight % Addition | Dusting Index |
|---|---|---|---|
| 8 | Triethyl phosphate | 1.00 | 9 |
| 9 | Tributyl phosphate | 0.25 | 6 |
| 10 | Tributyl phosphate | 0.50 | 4 |

EXAMPLES 11-19

Various tests were carried out using the same procedure outlined above to determine the effectiveness of the use of tributyl phosphate (TBP) as compared to Circo oil in reducing the dusting index for two different samples of a propionic acid treated zinc oxide. The results of the dusting index determinations from such tests are set forth in the attached Table II.

TABLE II
COMPARISON OF TBP* AND CIRCO OIL IN REDUCING DUSTINESS

| Example No | Zinc Oxide | Amount of TBP (%) | Amount of Circo Oil (%) | Dusting Index |
|---|---|---|---|---|
| 11 | Untreated | — | — | 2 |
| 12 (Control) | Propionic Acid Treated (Sample 1) | — | — | 30 |
| 13 | P.A.** Treated | 0.25 | — | 6 |
| 14 | P.A. Treated | 0.50 | — | 6 |
| 15 | P.A. Treated | 0.75 | — | 5 |
| 16 (Control) | P.A. Treated (Sample 2) | — | — | 17 |
| 17 | P.A. Treated | 0.1 | — | 13 |
| 18 | P.A. Treated | 0.05 | — | 11 |
| 19 | P.A. Treated | — | 0.25 | 11 |

*TBP = Tributyl Phosphate
**PA = Propionic Acid

EXAMPLES 20-30

Various tests were carried out using the procedure outlined above to determine the reduction in dusting index for two different samples of a propionic acid treated zinc oxide utilizing Circo oil alone, Circo oil in combination with tributyl phosphate or tributyl phosphate alone in varying amounts. The results of the dusting index determinations from such tests are set forth in the attached Table III.

TABLE III
EFFECT OF ADDING TBP*, CIRCO OIL, OR MIXTURES THEREOF TO A PROPIONIC ACID-TREATED OXIDE

| Example No. | Zinc Oxide | Circo Oil (%) | TBP (%) | Dusting Index |
|---|---|---|---|---|
| 20 (Control) | P.A.** Treated (Sample 1) | — | — | 17 |
| 21 | P.A. Treated | 0.25 | — | 11 |
| 22 | P.A. Treated | 0.25 | 0.1 | 7 |
| 23 | P.A. Treated | 0.25 | 0.05 | 8 |
| 24 (Control) | P.A. Treated (Sample 2) | — | — | 21 |
| 25 | P.A. Treated | — | 0.25 | 6 |
| 26 | P.A. Treated | 0.25 | — | 14 |
| 27 | P.A. Treated | 0.20 | 0.10 | 7 |
| 28 | P.A. Treated | 0.10 | 0.10 | 6 |
| 29 | P.A. Treated | 0.20 | 0.05 | 8 |
| 30 | P.A. Treated | 0.10 | 0.15 | 6 |

*TBP - Tributyl Phosphate
**PA - Propionic Acid

EXAMPLES 31-36

The properties of various rubber compositions prepared using treated zinc oxides produced via the addition of Circo oil or tributyl phosphate as compared to the use of a propionic acid treated zinc oxide, using the procedure set forth above to determine the dusting index, as well as other standard tests to determine various physical parameters, are set forth in the attached Table IV.

It can be seen from these results that while the dusting index is reduced substantially by the addition of approximately 0.25 weight percent of tributyl phosphate, as compared with the 0.5 weight percent of Circo oil, that the relative incorporation time in the rubber composition was not adversely affected and, in fact, compared favorably with the incorporation time displayed by propionic acid treated zinc oxide alone.

TABLE IV
EVALUATION OF PHOSPHATE-TREATED ZINC OXIDE IN RUBBER

| | | | Rheometer Properties | | Physical Properties | | | | | |
|---|---|---|---|---|---|---|---|---|---|---|
| | | | Cure at 320° F. | | Optimum Cure | | Oven-aged 24 Hr. at 100° C. | | | |
| Example No.* | Additive | ZnO Level (phr) | Scorch at 250° F. $t_s5$ (min.) | Modulus (lb.) | Optimum Cure $t_c90$ (min.) | 300% Modulus (lb.) | Tensile Strength (psi) | Tensile Strength (psi) | % Tensile Strength Retained | Dusting Index | Dispers. Grading (L-22) | Incorp. Time (Min.) |
| 31 | None | 2 | 36.0 | 71.0 | 6.7 | 1570 | 2800 | 1390 | 50 | 30 | 2½ | 1.55 |
| 32 | None | 5 | 36.5 | 74.0 | 7.9 | 1590 | 2960 | 1300 | 44 | | | |
| 33 | 0.5% Circo Oil | 2 | 36.5 | 74.0 | 8.9 | 1600 | 2830 | 1290 | 46 | 16 | 4 | 1.70 |
| 34 | 0.5% Circo Oil | 5 | 36.5 | 74.5 | 8.0 | 1670 | 2840 | 1380 | 49 | | | |
| 35 | 0.25% TBP** | 2 | 36.5 | 75.0 | 8.7 | 1600 | 2810 | 1290 | 46 | 6 | 3½ | 1.65 |
| 36 | 0.25% TBP** | 5 | 36.0 | 75.0 | 8.0 | 1740 | 2870 | 1310 | 46 | | | |

*Same base zinc oxide treated with propionic acid used in all cases.
**TBP - Tributyl Phosphate

EXAMPLES 37-40

Tests were carried out using the procedure set forth above to determine the dusting index of various samples of a zinc oxide which had been treated with varying amounts of propionic acid and tributyl phosphate which had been added via the spray bar of a liquid-solids blender to produce a treated pigment. The results of such measurements are set forth in Table V.

TABLE V

THE EFFECT ON DUSTING OF ADDING
A MIXTURE OF PROPIONIC ACID
AND TBP TO UNTREATED ZINC OXIDE

| Example No. | Propionic Acid (%) | TBP (%) | Dusting Index |
| --- | --- | --- | --- |
| 37 | — | — | 8 |
| 38 | 0.75 | — | 32 |
| 39 | 0.75 | 0.25 | 10 |
| 40 | 0.75 | 0.50 | 9 |

EXAMPLES 41–55

For comparison purposes the effect of various additives on the dusting index of a propionic acid treated zinc oxide determined in accordance with the above procedure is set forth in the attached Table VI.

TABLE VI

EFFECT OF VARIOUS ADDITIVES ON THE DUSTINESS
OF ZINC OXIDE TREATED WITH PROPIONIC ACID

| Example No. | Additive | Amount of Additive (%) | Dusting Index |
| --- | --- | --- | --- |
| 41 (Control I) | None | — | 29 |
| 42 | Triethanolamine | 0.5 | 54 |
| 43 | Zinc Chloride | 0.5 | 42 |
| 44 | Dioctyl Phthalate | 0.5 | 18 |
| 45 | Circo Oil | 0.5 | 16 |
| 46 | Tributyl Phosphate | 0.5 | 7 |
| 47 (Control II) | None | — | 32 |
| 48 | Dibutyl Phthalate | 0.5 | 20 |
| 49 | Propylene Glycol | 0.5 | 22 |
| 50 | Tributoxyethyl Phosphate | 0.5 | 7 |
| 51 | Tributyl Phosphate | 0.25 | 6 |
| 52 (Control III) | None | — | 11 |
| 53 | Dow ECR 77 (Electrically Conducting Resin) | 0.5 | 42 |
| 54 | Igepal CO-430 (Nonionic Surfactant) | 0.5 | 15 |
| 55 | Tributyl Phosphate) | 0.5 | 6 |

While the invention has been described with reference to a number of embodiments, it will be apparent to one skilled in the art that there are additional numerous variations which properly fall within the range of this invention. Therefore, it should be understood that the foregoing embodiments and examples are set forth to illustrate the advantages which may be achieved utilizing the present invention and should not be interpreted as limiting the scope of the invention.

I claim:

1. A treatment for reducing the dusting of a particulate zinc oxide which has been treated with propionic acid for incorporation in rubbers and plastics, comprising treating said particulate zinc oxide with a phosphate selected from the group consisting of trialkyl phosphates, tributoxyethyl phosphate, tricresyl phosphate and mixtures thereof in an amount sufficient to reduce the dusting index thereof.

2. A treatment according to claim 1 wherein the phosphate is selected from the group consisting of triethyl phosphate, tributyl phosphate and tributoxyethyl phosphate and mixtures thereof.

3. A treatment according to claim 1 wherein the phosphate is present in an amount from about 0.05 to about 1.0 weight percent based upon the total weight of the propionic acid treated zinc oxide.

4. A treatment according to claim 1 wherein the phosphate is present in an amount from about 0.20 weight percent to about 0.75 weight percent based upon the total weight of the propionic acid treated zinc oxide.

5. A treatment according to claim 1 wherein the trialkyl phosphate is triethyl phosphate.

6. A treatment according to claim 1 wherein the trialkyl phosphate is tributyl phosphate.

7. A treatment according to claim 1 wherein the phosphate is tributoxyethyl phosphate.

8. A treatment according to claim 1 wherein the phosphate is a mixture of one or more compounds selected from the group consisting of triethyl phosphate, tributyl phosphate, tributoxyethyl phosphate and tricresyl phosphate.

9. A treatment for reducing the dusting of a particulate zinc oxide which has been treated with propionic acid, for incorporation in rubbers and plastics, comprising treating said particulate zinc oxide with a mixture of a light processing oil and a phosphate selected from the group consisting of trialkyl phosphates, tributoxyethyl phosphate, tricresyl phosphate and mixtures thereof in an amount sufficient to reduce the dusting index thereof.

10. A treatment according to claim 9 wherein the phosphate is selected from the group consisting of triethyl phosphate, tributyl phosphate, tributoxyethyl phosphate, tricresyl phosphate and mixtures thereof.

11. A treatment according to claim 9 wherein the phosphate is present in an amount from about 0.05 to about 1.0 weight percent based upon the total weight of the propionic acid treated zinc oxide.

12. A treatment according to claim 9 wherein the phosphate is present in an amount from about 0.05 weight percent to about 0.25 weight percent based upon the total weight of the propionic acid treated zinc oxide.

13. A treatment according to claim 9 wherein the trialkyl phosphate is triethyl phosphate.

14. A treatment according to claim 9 wherein the trialkyl phosphate is tributyl phosphate.

15. A treatment according to claim 9 wherein the phosphate is tributoxethyl phosphate.

16. A treatment according to claim 9 wherein the phosphate is a mixture of one or more compounds selected from the group consisting of triethyl phosphate, tributyl phosphate, tributoxyethyl phosphate and tricresyl phosphate.

17. A zinc oxide product consisting essentially of a particulate zinc oxide which has been treated with propionic acid and subsequently treated with a phosphate selected from the group consisting of trialkyl phosphates, tributoxyethyl phosphate, tricresyl phosphate and mixtures thereof in an amount sufficient to reduce the dusting index thereof.

18. A product according to claim 17 wherein the phosphate is present in an amount from about 0.05 weight percent to about 1.0 weight percent based upon the total weight of the propionic acid treated zinc oxide.

19. A product according to claim 17 wherein the phosphate is present in an amount from about 0.20 weight percent to about 0.75 weight percent based upon the total weight of the propionic acid treated zinc oxide.

20. A product according to claim 17 wherein the trialkyl phosphate is triethyl phosphate.

21. A product according to claim 17 wherein the trialkyl phosphate is tributyl phosphate.

22. A product according to claim 17 wherein the phosphate is tributoxyethyl phosphate.

23. A product according to claim 17 wherein the phosphate is a mixture of phosphates selected from the group consisting of triethyl phosphate, tributyl phosphate, tributoxyethyl phosphate and tricresyl phosphate.

24. A zinc oxide product consisting essentially of a particulate zinc oxide which has been treated with propionic acid and subsequently treated with a mixture of a light processing oil and a phosphate selected from the group consisting of trialkyl phosphates, tributoxyethyl phosphate, tricresyl phosphate and mixtures thereof in an amount sufficient to reduce the dusting index thereof.

25. A zinc oxide product according to claim 24 wherein the light processing oil is Circo oil.

26. A zinc oxide product according to claim 24 wherein the phosphate is selected from the group consisting of triethyl phosphate, tributyl phosphate, tributoxyethyl phosphate, tricresyl phosphate and mixtures thereof.

27. A zinc oxide product according to claim 24 wherein the phosphate is present in an amount from about 0.05 to about 1.0 weight percent based upon the total weight of the propionic acid treated zinc oxide.

28. A zinc oxide product according to claim 24 wherein the phosphate is present in an amount from about 0.05 weight percent to about 0.25 weight percent based upon the total weight of the propionic acid treated zinc oxide.

29. A zinc oxide product according to claim 24 wherein the trialkyl phosphate is triethyl phosphate.

30. A zinc oxide product according to claim 24 wherein the trialkyl phosphate is tributyl phosphate.

31. A zinc oxide product according to claim 24 wherein the phosphate is tributoxyethyl phosphate.

32. A zinc oxide product according to claim 24 wherein the phosphate composition is a mixture of one or more compounds selected from the group consisting of triethyl phosphate, tributyl phosphate, tributoxyethyl phosphate and tricresyl phosphate.

* * * * *